US008855018B2

(12) United States Patent
Tie et al.

(10) Patent No.: US 8,855,018 B2
(45) Date of Patent: *Oct. 7, 2014

(54) METHOD FOR REALIZING CONVERGENT WAPI NETWORK ARCHITECTURE WITH SPLIT MAC MODE

(75) Inventors: Manxia Tie, Shaanxi (CN); Jun Cao, Shaanxi (CN); Zhiqiang Du, Shaanxi (CN); Xiaolong Lai, Shaanxi (CN); Li Ge, Shaanxi (CN); Zhenhai Huang, Shaanxi (CN)

(73) Assignee: China IWNCOMM Co., Ltd., Shaanxi (CN)

( * ) Notice: Subject to any disclaimer, the term of this patent is extended or adjusted under 35 U.S.C. 154(b) by 34 days.

This patent is subject to a terminal disclaimer.

(21) Appl. No.: 13/203,643

(22) PCT Filed: Dec. 14, 2009

(86) PCT No.: PCT/CN2009/075539
§ 371 (c)(1),
(2), (4) Date: Aug. 26, 2011

(87) PCT Pub. No.: WO2010/096998
PCT Pub. Date: Sep. 2, 2010

(65) Prior Publication Data
US 2011/0310771 A1 Dec. 22, 2011

(30) Foreign Application Priority Data
Feb. 27, 2009 (CN) .......................... 2009 1 0021422

(51) Int. Cl.
H04L 12/28 (2006.01)
H04W 12/06 (2009.01)
H04W 12/04 (2009.01)
H04W 84/12 (2009.01)

(52) U.S. Cl.
CPC .............. *H04W 12/06* (2013.01); *H04W 12/04* (2013.01); *H04W 84/12* (2013.01)
USPC .................................... 370/255; 725/3; 725/5

(58) Field of Classification Search
None
See application file for complete search history.

(56) References Cited

U.S. PATENT DOCUMENTS 6,788,658 B1 9/2004 Bims
7,991,152 B2 8/2011 Gueron et al.
(Continued)

FOREIGN PATENT DOCUMENTS

CN 1681239 A 10/2005
CN 1691582 A 11/2005
(Continued)

OTHER PUBLICATIONS

International Search Report issued in PCT/CN2009/075539, mailed Mar. 25, 2010.
(Continued)

*Primary Examiner* — Robert Wilson
(74) *Attorney, Agent, or Firm* — Greer Burns & Crain Ltd.

(57) ABSTRACT

A method for realizing a convergent Wireless Local Area Networks (WLAN) Authentication and Privacy Infrastructure (WAPI) network architecture with a split Medium Access Control (MAC) mode involves the steps: a split MAC mode for realizing WLAN Privacy Infrastructure (WPI) by a wireless terminal point is constructed through separating the MAC function and the WAPI function of the wireless access point apart to the wireless terminal point and an access controller; integration of a WAPI and a convergent WLAN network system architecture is realized under the split MAC mode that the wireless terminal point realizes WPI; the association connection process is performed among a station point, a wireless terminal point and an access controller; the process for announcing the start of performing the WLAN Authentication Infrastructure (WAI) protocol between the access controller and the wireless terminal point is performed; the process for performing the WAI protocol between the station point and the access controller is performed; the process for announcing the end of performing the WAI protocol between the access controller and the wireless terminal point is performed; the secret communication process is performed between the wireless terminal point and the station by using WPI.

4 Claims, 2 Drawing Sheets

(56) References Cited

U.S. PATENT DOCUMENTS

| | | | |
|---|---|---|---|
| 8,086,749 | B2 | 12/2011 | Townsley et al. |
| 8,335,490 | B2 | 12/2012 | Kaippallimalil |
| 2005/0044249 | A1 | 2/2005 | Teng et al. |
| 2005/0182830 | A1 | 8/2005 | Abhishek et al. |
| 2006/0129807 | A1 | 6/2006 | Halasz et al. |
| 2008/0072047 | A1 | 3/2008 | Sarikaya et al. |
| 2008/0117477 | A1 | 5/2008 | Fujise |
| 2008/0134288 | A1 | 6/2008 | Halasz et al. |
| 2008/0295144 | A1 | 11/2008 | Cam-Winget et al. |
| 2009/0052674 | A1 | 2/2009 | Nishida et al. |
| 2010/0217986 | A1 | 8/2010 | Schneider |
| 2011/0058670 | A1 | 3/2011 | Ala-Laurila et al. |
| 2011/0307621 | A1* | 12/2011 | Lai et al. ........................ 709/229 |
| 2011/0307943 | A1* | 12/2011 | Du et al. ............................ 726/5 |
| 2011/0310771 | A1* | 12/2011 | Tie et al. ........................ 370/255 |

FOREIGN PATENT DOCUMENTS

| | | |
|---|---|---|
| CN | 1905504 A | 1/2007 |
| CN | 1996840 A | 7/2007 |
| CN | 101155396 A | 4/2008 |
| CN | 101192923 A | 6/2008 |
| CN | 101577904 A | 11/2009 |
| CN | 101577905 A | 11/2009 |
| CN | 101577978 A | 11/2009 |
| WO | WO 2005/081567 A1 | 9/2005 |
| WO | WO 2008/069520 A1 | 6/2008 |
| WO | WO 2008/080351 A1 | 7/2008 |

OTHER PUBLICATIONS

Chinese Office Action issued in Chinese counterpart application 200910021422.6, dated Jul. 12, 2010.

International Search Report and Written Opinion issued in PCT/CN2009/075536, mailed Mar. 25, 2010.

Zhao-Hui Tang et al. "On the Security of WAI Protocol in the Third Version of WAPI," International Conference of Intelligent Information Hiding and Multimedia Signal Processing; 2008 IEEE; pp. 516-519.

Li Huixan et al.; "Improvement on WLAN multicast key management protocol"; 2008 International Conference on Computational Intelligence and Security; pp. 419-424.

Qiang Tang; "On the Security of Three Versions of the WAI Protocol in Chinese WLAN Implementation Plan;" Second International Conference on Communications and Networking in China; 200; pp. 1-7.

Xiang Wang, et al., "Communication Protocol of Centralized WLAN Architecture," Computer Engineering, Nov. 2008, vol. 34, No. 22, pp. 115-117.

Wu, et al., Security Analysis of WAPI Authentication and Key Exchange Protocol; 2007; pp. 1-9.

Office Action Issued in U.S. Appl. No. 13/203,646, mailed Feb. 21, 2014.

International Search Report issued in PCT/CN2009/075536 (English and Chinese) and Written Opinion of the ISA (Chinese), ISA/CN, Beijing, China, mailed Mar. 18, 2010.

Office Action issued in U.S. Appl. No. 13/203,646, mailed Feb. 13, 2013.

Office Action issued in U.S. Appl. No. 13/203,646, mailed Aug. 5, 2013.

Office Action issued in U.S. Appl. No. 13/203,645, mailed Nov. 7, 2013.

International Search Report (English and Chinese) and Written Opinion of the ISA (Chinese), ISA/CN, Beijing, China, mailed Mar. 18, 2010.

* cited by examiner

US 8,855,018 B2

METHOD FOR REALIZING CONVERGENT WAPI NETWORK ARCHITECTURE WITH SPLIT MAC MODE

CROSS REFERENCE TO RELATED APPLICATIONS

The present application is a US National Stage of International Application No. PCT/CN2009/075539, filed 14 Dec. 2009, designating the United States, and claiming priority to Chinese Patent Application No. 200910021422.6 filed 27 Feb. 2009.

This application claims priority to Chinese Patent Application No.: 200910021422.6, filed with the Chinese Patent Office on Feb. 27, 2009 and entitled "Method for implementing convergent WAPI network architecture in split MAC mode", which is hereby incorporated by reference in its entirety.

FIELD

The present invention relates to a method for implementing a convergent WAPI network architecture in a split MAC mode.

BACKGROUND

A wireless Access Point (AP) in a Wireless Local Area Network (WLAN) of an autonomous architecture is fully deployed and terminated with the WLAN function and managed separately as a separate entity over the network. The autonomous architecture is commonly adopted for a WLAN currently designed in the Wireless Local Area Network (WLAN) Authentication and Privacy Infrastructure (WAPI), but a network operation mode of this autonomous architecture has gradually become an obstacle restricting the development of wireless technologies due to its inherent drawbacks along with an increasing scale at which the WLAN is deployed.

Firstly the AP which is an Internet Protocol (IP) addressable device has to be separately managed (including monitored, configured, controlled, etc.) in the WLAN of the autonomous architecture. When the network is deployed at a large scale, a large number of APs may give rise to a tremendous management overhead resulting in a heavy burden upon the network. This phenomenon may be more pronounced especially if configurations of the APs over the network are managed differently from each other, which may discourage the development of wireless technologies.

Secondly it is somewhat difficult to ensure consistent configuration parameters of all the APs in the WLAN of the autonomous architecture because the majority of the configuration parameters for the APs may be parameters to be configured dynamically in addition to static parameters. It may be burdensome and even impossible to make an effort for timely updating of dynamic configurations of the APs throughout the large-scale WLAN.

Thirdly a wireless transmission medium is a shared resource in the WLAN, and in order to improve the performance of the network, the respective APs shall be monitored in real time and the configurations of these APs shall be updated dynamically according to the current usage of the shared medium, but manual configuring of the AP parameters related to the wireless transmission medium may consume a lot of human and material resources.

Fourthly it is also difficult to secure an access to the network and prevent an access of an illegal AP in the WLAN of the autonomous architecture. An AP is typically deployed in such a position that makes it difficult to protect the AP, and once the AP is stolen, security information loaded thereon may be leaked, and the security of the network may be endangered.

In summary, a heavy management burden upon the network may result from monitoring, configuring and controlling of the APs in the WLAN of the autonomous architecture, especially when the WLAN is deployed at a large scale. Furthermore it is also rather difficult to maintain consistent configurations of the APs. Furthermore the shared and dynamic wireless transmission medium requires consistent cooperation of the APs over the network to strive for the maximum network performance and the minimum wireless interference, and this will be more demanding for configuration management of the APs. Security is one of important factors to be considered when the wireless network is designed, and large-scale deployment may also pose a great challenge to the security of the WLAN. As can be apparent, the operation mode over the WLAN of the autonomous architecture has been incapable of accommodating a demand for deploying a large-scale network, and it is highly desired to design a WAPI based convergent WLAN network architecture, i.e., a WAPI thin AP architecture.

SUMMARY

An object of the invention is to obviate the drawbacks of the foregoing autonomous WLAN network architecture by providing a method for implementing a convergent WAPI network architecture in a split MAC mode in which a Wireless Local Area Network (WLAN) Privacy Infrastructure (WPI) is implemented by a Wireless Terminal Point (WTP), where a Medium Access Control (MAC) function and a WAPI function of APs are divided for centralized control and management of the APs throughout the network to accommodate a demand for deploying a large-scale WLAN.

In a technical solution of the invention, a method for implementing a convergent WAPI network architecture in a split MAC mode is provided, wherein the method includes the following operations:

1) constructing a split MAC mode in which a WPI is implemented by a wireless terminal point: splitting an MAC function and a WAPI function of a wireless access point onto the wireless terminal point and an access controller; and 2) integrating the WAPI and a convergent WLAN network architecture in the split MAC mode in which the WPI is implemented by the wireless terminal point by:

2.1) performing an association connection process between a station and both the wireless terminal point and the access controller;

2.2) performing a Wireless Local Area Network (WLAN) Authentication Infrastructure (WAI) protocol execution commencement announcement process between the access controller and the wireless terminal point;

2.3) performing a WAI protocol execution process between the station and the access controller;

2.4) performing a WAI protocol execution termination announcement process between the access controller and the wireless terminal point; and 2.5) performing an encrypted communication process between the wireless terminal point and the station through the WPI.

The operation 2.1) includes:

2.1.1) the station listens passively to a beacon frame of the wireless terminal point and acquires parameters of the wireless terminal point including WAPI information elements; or the station transmits on its own initiative a probe request frame to the wireless terminal point, the wireless terminal point transmits a probe response frame to the station upon reception of the probe request frame of the station, and the station acquires the parameters of the wireless terminal point including the WAPI information elements upon reception of the probe response frame; wherein the WAPI information elements include suites of authentication and key management and suites of ciphers supported by the wireless terminal point;

2.1.2) the station transmits a link authentication request frame to the access controller for authenticating a link to the access controller;

2.1.3) the access controller transmits a link authentication response frame to the station in response to the link authentication request frame of the station;

2.1.4) the station transmits an association request frame to the access controller for association with the access controller upon successful link authentication by including in the association request a WAPI information element determining a suite of authentication and key management and a suite of ciphers selected by the station; and 2.1.5) the access controller parses the association request frame of the station and transmits an association response frame to the station.

The operation 2.2) includes:

2.2.1) the access controller transmits a WAI execution commencement announcement to the wireless terminal point to notify the wireless terminal point about information on the MAC address of the station, a WLAN ID number, an authentication commencement indicator, etc. wherein the authentication commencement indicator instructs the wireless terminal point to disabled a controlled port and to merely forward WAI protocol data originating from the corresponding station; and 2.2.2) the wireless terminal point transmits a WAI execution commencement announcement response message to the access controller.

The operation 2.3) includes:

2.3.1) performing a WAI authentication process between the access controller and the station;

2.3.2) performing a WAI uni-cast key negotiation process between the access controller and the station; and 2.3.3) performing a WAI multi-cast key announcement process between the access controller and the station.

The operation 2.4) includes:

2.4.1) the access controller transmits a WAI execution termination announcement to the wireless terminal point to notify the wireless terminal point about information on the MAC address of the station, a WLAN ID number, key data, a suite of ciphers and an authentication termination indicator, wherein the authentication termination indicator instructs the wireless terminal point to enable a controlled port and to forward all the data including WAI protocol data and other data than the WAI protocol data originating from the corresponding station; and 2.4.2) the wireless terminal point transmits a WAI execution termination announcement response message to the access controller.

The operation 2.5) includes:

2.5.1) the wireless terminal point encrypts and transmits data intended for the station; and 2.5.2) the wireless terminal point decrypts and forwards data originating from the station.

The method further includes an operation 2.6) of performing of a uni-cast key update process between the access controller and the station after the operation 2.5).

The operation 2.6) includes:

2.6.1) performing a WAI uni-cast key negotiation process between the access controller and the station when the uni-cast key needs to be updated;

2.6.2) the access controller transmits a uni-cast key update announcement to the wireless terminal point to announce information on the MAC address of the station, a WLAN ID, updated uni-cast key data, an updated suite of ciphers, etc. after the WAI uni-cast key negotiation process is performed; and 2.6.3) the wireless terminal point transmits a uni-cast key update announcement response to the access controller.

The method further includes an operation 2.7) of performing a multi-cast key update process between the access controller and the station after the operation 2.5) or 2.6).

The operation 2.7) includes:

2.7.1) the access controller firstly transmits to the wireless terminal point a multi-cast key update commencement announcement including information on a WLAN ID, multi-cast key data, a data Packet Number, etc. when a multi-cast key needs to be updated;

2.7.2) the wireless terminal point transmits a multi-cast key update commencement announcement response to the access controller upon reception of the multi-cast key update commencement announcement;

2.7.3) performing a WAI multi-cast key announcement process between the access controller and the station;

2.7.4) the access controller transmits to the wireless terminal point a multi-cast key update termination announcement including information on a multi-cast key index, a multi-cast key update termination indicator, etc. after the WAI multi-cast key announcement process is performed; and 2.7.5) the wireless terminal point responds to the multi-cast key update termination announcement of the access controller by transmitting a multi-cast key update termination announcement response to the access controller.

The invention provides a communication interaction flow between entities in the convergent WLAN network architecture of the split MAC mode. The MAC function and the WAPI function of the AP are split onto the WTP and the Access Controller (AC) so that the WTP performs interaction of real-time information (including a beacon frame, a response to a probe request frame, etc.) with the station (STA) and executes the WPI protocol and AC performs non-real-time interaction (including association, the WAI protocol, etc.) with the STA. This mode with division of the AP functions is referred to as the split MAC mode with the WPI being implemented by the WTP. The invention has the following advantages over the prior art: the invention proposes a method for implementing a convergent WAPI network architecture in a split MAC mode, which obviates the limitation of the existing autonomous network architecture based upon the WAPI protocol in which a demand for deploying a large-scale WLAN cannot be accommodated. With the split MAC mode, the AC performs uniform monitoring, configuring and control of WTPs for the purpose of centralized management on WTPs over the WLAN; and the AC executes the WAI protocol and the WTP executes the WPI protocol so that the WAPI protocol and the convergent WLAN architecture are integrated seamlessly to secure the WLAN. In summary, the invention can both accommodate a demand for deploying a large-scale WLAN and secure the WLAN in the convergent architecture.

DETAILED DESCRIPTION

Figure 1:
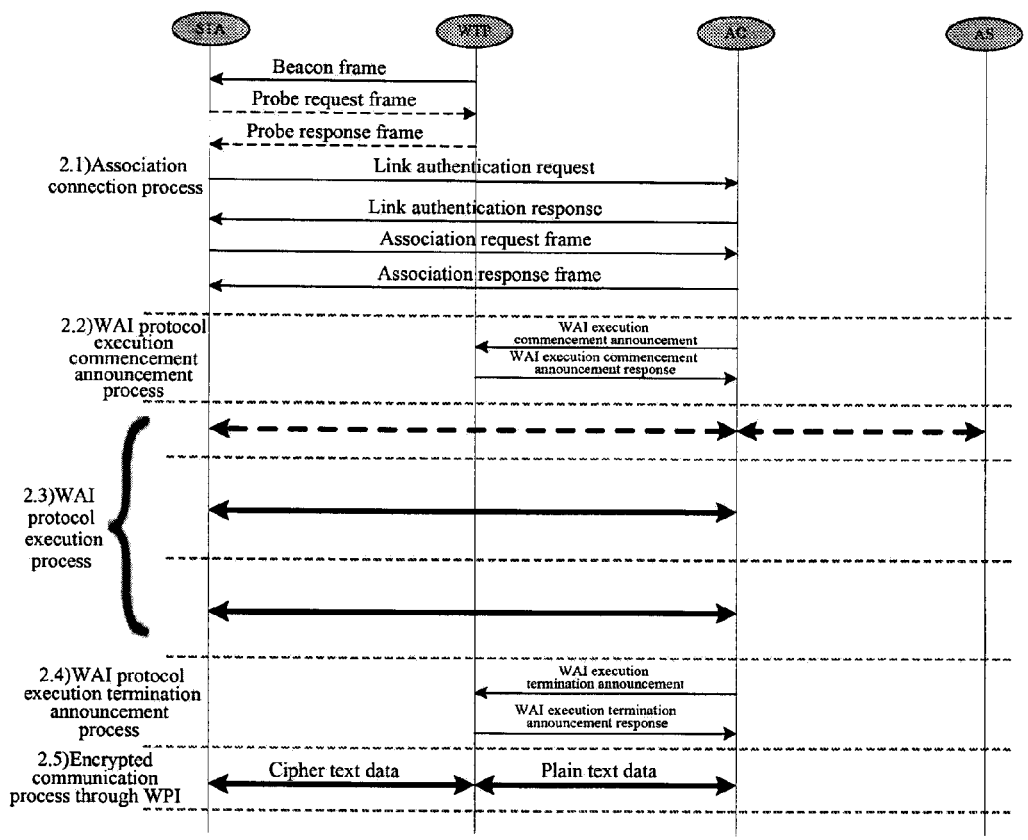
FIG. 1 is a flow chart of messages in a convergent WAPI network architecture of a split MAC mode in which a WPI is implemented by a WTP.

Referring to FIG. 1, a specific method according to a preferred embodiment of the invention is as follows.

1) A split MAC mode with a WPI implemented by a wireless terminal point is constructed: an MAC function and a WAPI function of an AP are split onto the Wireless Terminal Point (WTP) and an Access Controller (AC);

2) A WAPI and a convergent WLAN network architecture are integrated in the split MAC mode with the WPI implemented by the wireless terminal point;

2.1) An association connection process between an STA and both the WTP and the AC:

2.1.1) the STA listens passively to a beacon frame of the WTP and acquires WTP related parameters including WAPI information elements, e.g., suites of authentication and key management and suites of ciphers supported by the WTP, etc.; or the STA transmits on its own initiative a probe request frame to the WTP, the WTP transmits a probe response frame to the STA upon reception of the probe request frame of the STA, and the STA acquires the WTP related parameters including the WAPI information elements, e.g., the suites of authentication and key management and the suites of ciphers supported by the WTP, etc., upon reception of the probe response frame of the WTP;

2.1.2) the STA transmits a link authentication request frame to the AC for authenticating a link to the AC upon reception of the probe response of the WTP;

2.1.3) the AC transmits a link authentication response frame to the STA in response to the link authentication request frame of the STA;

2.1.4) the STA transmits an association request frame to the AC for association with the AC upon successful link authentication by including in the association request a WAPI information element determining a suite of authentication and key management and a suite of ciphers selected by the STA; and 2.1.5) the AC parses the association request frame of the STA and transmits an association response frame to the STA.

2.2) A WAI protocol execution commencement announcement process between the AC and the WTP:

2.2.1) the AC transmits a WAI execution commencement announcement to the WTP to notify the WTP about information on the MAC address of the STA, a WLAN ID number, an authentication commencement indicator, etc., where the authentication commencement indicator instructs the WTP to disabled a controlled port and to forward only WAI protocol data originating from the corresponding STA; and 2.2.2) the WTP transmits a WAI execution commencement announcement response message to the AC.

2.3) A WAI protocol execution process between the STA and the AC:

2.3.1) a WAI authentication process between the AC and the STA;

2.3.2) a WAI uni-cast key negotiation process between the AC and the STA; and 2.3.3) a WAI multi-cast key announcement process between the AC and the STA.

2.4) A WAI protocol execution termination announcement process between the AC and the WTP:

2.4.1) the AC transmits a WAI execution termination announcement to the WTP to notify the WTP about information on the MAC address of the STA, a WLAN ID, key data, a suite of ciphers, an authentication termination indicator, etc., where the authentication termination indicator instructs the WTP to enable the controlled port and to forward all the data including WAI protocol data and other data than the WAI protocol data originating from the corresponding STA; and 2.4.2) the WTP transmits a WAI execution termination announcement response message to the AC.

2.5) An encrypted communication process performed between the WTP and the STA through the WPI:

2.5.1) the WTP encrypts and transmits data intended for the STA; and 2.5.2) the WTP decrypts and forwards data originating from the STA.

Figure 2:
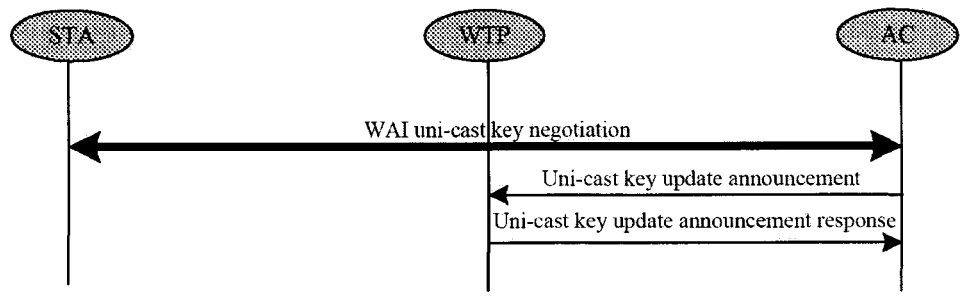
FIG. 2 is a flow chart of updating a uni-cast key between an AC and an STA.

Referring to FIG. 2, the flow of the invention further includes an operation 2.6) of a uni-cast key update process between the AC and the STA:

2.6.1) a WAI uni-cast key negotiation process is performed between the AC and the STA when a uni-cast key needs to be updated;

2.6.2) the AC transmits a uni-cast key update announcement to the WTP to announce information on the MAC address of the STA, a WLAN ID, updated uni-cast key data, an updated suite of ciphers, etc., after the WAI uni-cast key negotiation process is performed; and 2.6.3) the WTP transmits a uni-cast key update announcement response to the AC.

Figure 3:
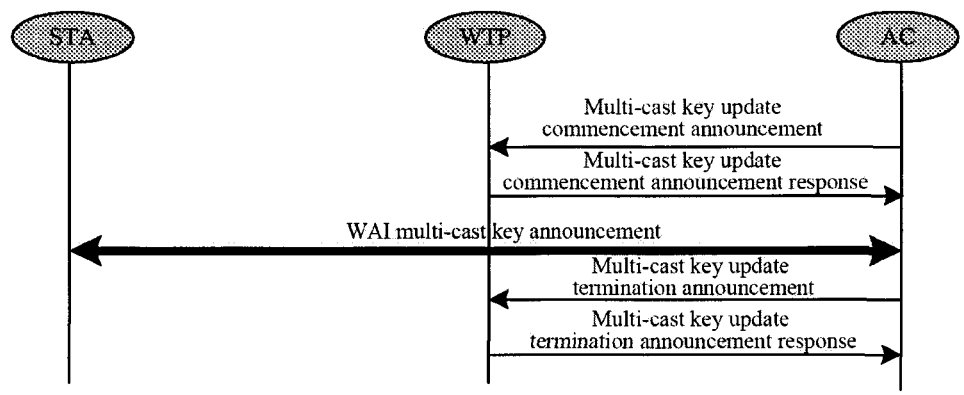
FIG. 3 is a flow chart of updating a multi-cast key between an AC and an STA.

Referring to FIG. 3, the flow of the invention further includes an operation 2.7) of a multi-cast key update process between the AC and the STA:

2.7.1) the AC firstly transmits to the WTP a multi-cast key update commencement announcement including information on a WLAN ID, multi-cast key data, a data Packet Number (PN), etc., when a multi-cast key needs to be updated;

2.7.2) the WTP transmits a multi-cast key update commencement announcement response to the AC upon reception of the multi-cast key update commencement announcement;

2.7.3) a WAI multi-cast key announcement process is performed between the AC and the STA;

2.7.4) the AC transmits to the WTP a multi-cast key update termination announcement including information on a multi-cast key index, a multi-cast key update termination indicator, etc., after the WAI multi-cast key announcement process is performed; and 2.7.5) the WTP responds to the multi-cast key update termination announcement of the AC by transmitting a multi-cast key update termination announcement response to the AC.

In the foregoing embodiments, a secure channel between the AC and the WTP may be preset in order to secure the key data in the operations 2.2), 2.4), 2.6) and 2.7). The secure channel may be established through arranging a private network between the AC and the WTP or utilizing a security protocol (e.g., the Datagram Transport Layer Security (DTLS) protocol).

The invention claimed is:

1. A method of associating a station with a wireless terminal point and an access controller, comprising:

listening passively, by the station, to a beacon frame of the wireless terminal point and acquiring, by the station, parameters of the wireless terminal point comprising WAPI information elements; or transmitting, by the station, on its own initiative a probe request frame to the wireless terminal point, transmitting, by the wireless terminal point, a probe response frame to the station upon reception of the probe request frame of the station, and acquiring, by the station, the parameters of the wireless terminal point including the WAPI information elements upon reception of the probe response frame of the wireless terminal point; wherein the WAPI information elements include suites of authentication and key management and suites of ciphers supported by the wireless terminal point;

transmitting, by the station, a link authentication request frame to the access controller for authenticating a link to the access controller;

transmitting, by the access controller, a link authentication response frame to the station in response to the link authentication request frame of the station;

transmitting, by the station, an association request frame to the access controller for association with the access controller upon successful link authentication by comprising in the association request a WAPI information element comprising a suite of authentication and key management and a suite of ciphers selected by the station from said WAPI information elements; and parsing, by the access controller, the association request frame of the station to extract the WAPI information element comprising the suite of authentication and key management and the suite of ciphers selected by the station, and transmitting, by the access controller, an association response frame to the station.

2. A method of notifying a wireless terminal point about commencement of a Wireless Local Area Network (WLAN) Authentication Infrastructure (WAI) protocol, the method comprising:

transmitting, by the access controller, a WAI execution commencement announcement to the wireless terminal point in order to notify the wireless terminal point about information on an MAC address of a station, a WLAN ID number and an authentication commencement indicator, wherein the authentication commencement indicator instructs the wireless terminal point to disable a controlled port and to forward only WAI protocol data originating from the station; and transmitting, by the wireless terminal point, a WAI execution commencement announcement response message to the access controller.

3. A method of notifying a wireless terminal point about termination of a Wireless Local Area Network (WLAN) Authentication Infrastructure (WAI) protocol, the method comprising:

transmitting, by an access controller, a WAI execution termination announcement to the wireless terminal point in order to notify the wireless terminal point about information on an MAC address of a station, a WLAN ID number, key data, a suite of ciphers and an authentication termination indicator, wherein the authentication termination indicator instructs the wireless terminal point to enable a controlled port and to forward all data originating from the station; and transmitting, by the wireless terminal point, a WAI execution termination announcement response message to the access controller.

4. The method according to claim 3, further comprising:

upon reception of the WAI execution termination announcement response message, encrypting and transmitting data intended for the station by the wireless terminal point; and decrypting and forwarding data originating from the station by the wireless terminal point.

\* \* \* \* \*